United States Patent
Loftus et al.

(10) Patent No.: US 7,118,343 B2
(45) Date of Patent: Oct. 10, 2006

(54) TRAILING EDGE ADJUSTABLE WEIGHT SYSTEM FOR HELICOPTER MAIN ROTOR BLADES

(75) Inventors: Robert T. Loftus, Gilbert, AZ (US); Michael J. McNulty, Scottsdale, AZ (US); Kevin D. Henthorn, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 10/847,006

(22) Filed: May 17, 2004

(65) Prior Publication Data
US 2005/0254947 A1    Nov. 17, 2005

(51) Int. Cl.
*F01D 5/00* (2006.01)
(52) U.S. Cl. ...................... 416/145; 416/500
(58) Field of Classification Search ........ 416/144–145, 416/500, 228, 237
See application file for complete search history.

(56) References Cited

U.S. PATENT DOCUMENTS

| | | | | |
|---|---|---|---|---|
| 3,999,888 A | * | 12/1976 | Zincone | 416/145 |
| 4,601,639 A | * | 7/1986 | Yen et al. | 416/230 |
| 6,311,924 B1 | * | 11/2001 | Ferrer | 244/17.13 |

* cited by examiner

*Primary Examiner*—Edward K. Look
*Assistant Examiner*—Devin Hanan
(74) *Attorney, Agent, or Firm*—Thompson Coburn LLP (57) ABSTRACT

A system of adjustable balancing weights is provided for a helicopter main rotor blade. The trailing edge of the rotor blade is formed with a plurality of recesses that each receive an aerodynamically shaped weight to adjust and balance the weight of the rotor blade. A forward weight recess and a forward weight are also provided on the rotor blade adjacent the rotor blade leading edge. The lateral spacing between the weight adjacent the rotor blade leading edge and the weights adjacent the rotor blade trailing edge provides greater flexibility in balancing the mass of the rotor blade.

20 Claims, 7 Drawing Sheets

TRAILING EDGE ADJUSTABLE WEIGHT SYSTEM FOR HELICOPTER MAIN ROTOR BLADES

This invention was developed in the course of work under U.S. Government Army Contract DAAB07-97-9-J046. The U.S. government may possess certain rights in the invention.

BACKGROUND OF THE INVENTION (1) Field of the Invention

The present invention pertains to an adjustable weight system for a rotor blade of a rotary wing aircraft. Specifically, the present invention pertains to an adjustable weight system for a helicopter rotor blade, where the trailing edge of the rotor blade is formed with a plurality of recesses that each receive an aerodynamically shaped weight to adjust and balance the weight of the rotor blade.

(2) Description of the Related Art

For rotary wing aircraft, for example helicopters, it is necessary that the rotor blades of the aircraft have a mass balance adjustment capability at the tip end or distal end of each rotor blade. Balancing the weight of a rotor blade enables a set of the balanced rotor blades to be operated with reduced vibration. The mass balance adjustment of the rotor blade is provided for both the spanwise direction, i.e. the longitudinal length of the rotor blade, and the chordwise direction, i.e. the lateral width of the rotor blade. This is typically achieved by a helicopter rotor blade balance system that has a pair of adjustable weights positioned adjacent the leading edge of the rotor blade and the distal end of the rotor blade. The two adjustable weights are spaced from each other in the chordwise or lateral direction on the rotor blade. The weights are positioned in a pair of mechanical pockets provided in the surface of the rotor blade. The pockets are typically constructed of metal to withstand the load created by the weights contained in the pockets and to transfer the load to the rotor blade structure.

Figure 1:
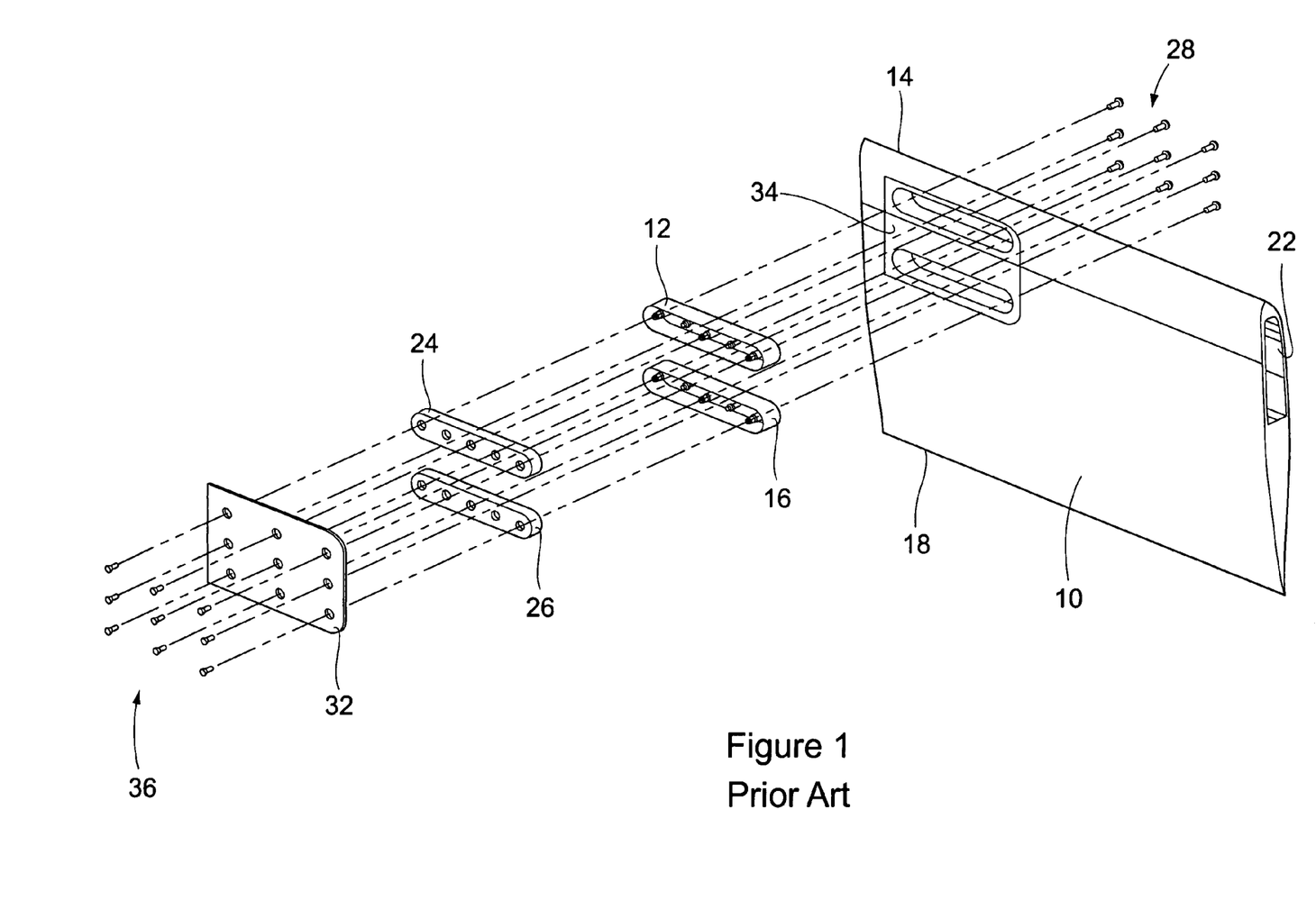
FIG. 1 is a partial view of a prior art rotor blade weight balancing and adjusting system.

A typical construction of a prior art rotor blade mass balance system is shown in FIG. 1. FIG. 1 shows a section of a rotor blade 10 adjacent the blade distal end. A first forward pocket 12 is positioned in a complementary shaped cavity in the rotor blade adjacent the blade leading edge 14, and a second forward pocket 16 is positioned in a complementary shaped cavity in the rotor blade adjacent the first forward pocket 12. The first pocket 12 and second pocket 16 are typically secured to the rotor blade structural spar tube 22. This positioning of the pair of pockets 12,16 provides sufficient structural strength to the pockets in the blade.

A pair of weights 24, 26 are positioned in the pockets 12, 16 in adjusting the mass balance of the rotor blade. The weights 24, 26 are secured in the pockets 12, 16 by a plurality of mechanical fasteners 28, for example, self-locking screws. A cover plate 32 is provided to cover over the pair of weights 24, 26. The cover plate 32 fits into a complementary shaped recess 34 in the surface of the blade 10. A plurality of mechanical fasteners 36, for example self-locking screws, are provided to secure the cover plate 32 to the surface of the blade 10.

The above described mass balancing system of the prior art is disadvantaged in that the two weight pockets 12, 16 cannot be spaced any further apart in the chordwise or lateral direction of the blade 10 beyond the lateral width of the rotor blade spar tube 22. The structure of the tube 22 is needed to secure the pockets 12, 16 and weights 24, 26 in the rotor blade 10. The portion of the rotor blade 10 that extends aft of the spar tube 22 is typically constructed of lightweight composite material skins or layers that extend over the opposite sides of a core material of the blade. This portion of the blade is typically configured and dimensioned to maintain an aerodynamic shape. The thickness dimensions of this portion of the blade are not sufficiently large to retain the weight pockets and their associated weighs, without adding significant reinforcement, which unacceptably adds weight to the blade.

SUMMARY OF THE INVENTION

The present invention provides a trailing edge adjustable weight system for helicopter main rotor blades that overcomes the disadvantages associated with the prior air system of mass balancing rotor blades. The system of the invention enables the addition of a sufficient amount of mass or weight to the rotor blade for the required mass balancing of the rotor blade. The weights are easily accessible, and the impact of the weights on the surrounding structure of the rotor blade is minimized. The modification required of the rotor blade to implement the adjustable weight system is inexpensive, and does not significantly impact the aerodynamics of the rotor blade outer mold line.

The system of the invention comprises a plurality of depressions or aft recesses formed into the lower surface of the rotor blade adjacent the blade trailing edge. In the preferred embodiment, three aft recesses are formed into the rotor blade lower surface. A fastener hole is provided in each of the recesses. The fastener hole extends through the rotor blade.

A forward weight pocket is also formed into the rotor blade lower surface adjacent the leading edge of the rotor blade, as was done in the prior art. However, because providing weights adjacent the rotor blade trailing edge provides greater flexibility in mass balancing in the chordwise or lateral direction of the rotor blade, only one forward weight pocket is formed in the rotor blade. A balancing weight and a cover plate are provided for the forward weight pocket in a similar manner to that of the prior art.

In addition to the forward pocket weight, the system of the invention comprises a plurality of aft weights. Each of the aft weights has a configuration that is complementary to the configuration of the aft recesses. Each of the aft weights has the same configuration or shape, however each of the aft weights can have a different mass. In this manner, the system of the invention provides a great deal of flexibility in adding weight to the trailing edge of the rotor blade.

Each of the aft weights are comprised of a molded plastic body having a metallic core. The bodies of the weights are identical in size and shape. Weight variability is achieved by utilizing different size and/or density metallic core inserts in the plastic bodies of the weights. The metallic inserts also incorporate a threaded hole. A retention screw is passed through the hole in the blade recess from the upper surface of the blade and is screw threaded into the threaded hole of the weight to secure the weight in the recess.

The system of the invention simplifies the mass balancing of the rotor blade by allowing the spanwise or longitudinal length adjustments to the blade to be performed by removing or adding the forward weight to the single forward weight pocket. Secondly, the system minimizes the quantity of weight required to make a chordwise or lateral weight adjustment. This is due to the greater distance provided between the forward weight and the aft adjustable weights along the lateral width of the blade. The system of the invention also provides the benefit of reducing the size of the aft weights secured in the weight recesses due to the large lateral offset distance between the forward weight pocket and the aft weight recesses. The offset distance between the two sets of weights also enables the elimination of the second forward weight pocket of the prior art.

Thus, the system of the invention reduces the total system weight required to achieve the desired mass balance adjustability of the rotor blade. The system also reduces the fabrication costs of the rotor blade assembly by eliminating the necessity for the second forward adjustable weight pocket that was required by the prior art. Still further, the system reduces the level of effort required to perform a mass balancing operation on the rotor blade at the initial manufacturing of the blade as well as throughout the life of the rotor blade assembly.

BRIEF DESCRIPTION OF THE DRAWINGS

Further features of the rotor blade weight adjustment system of the invention are set forth in the following detailed description of the preferred embodiment of the invention and in the drawing figures wherein.

DETAILED DESCRIPTION OF THE PREFERRED EMBODIMENT

Figure 2:
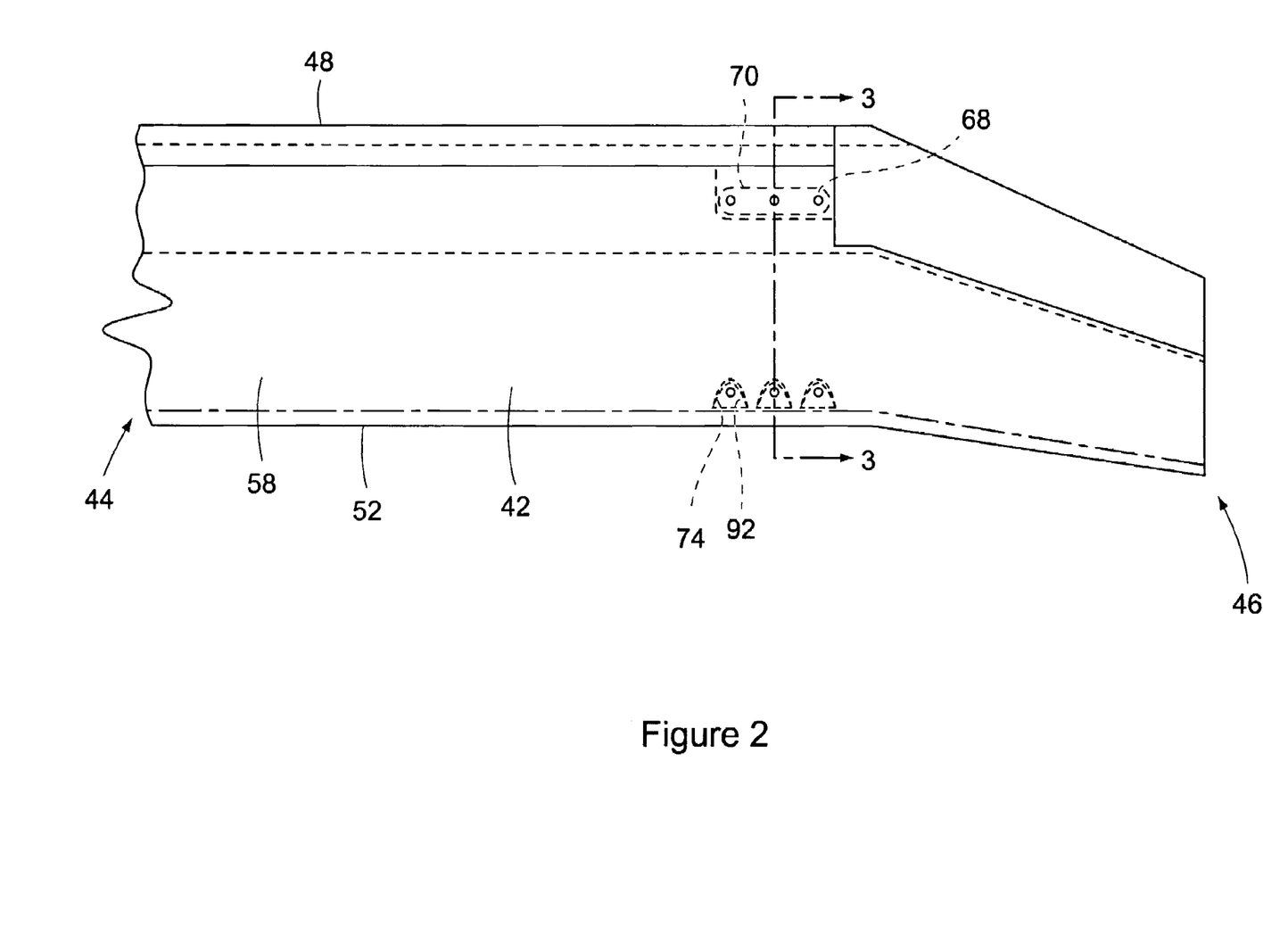
FIG. 2 is a partial plan view of the rotor blade weight adjusting and balancing system of invention.
Figure 3:
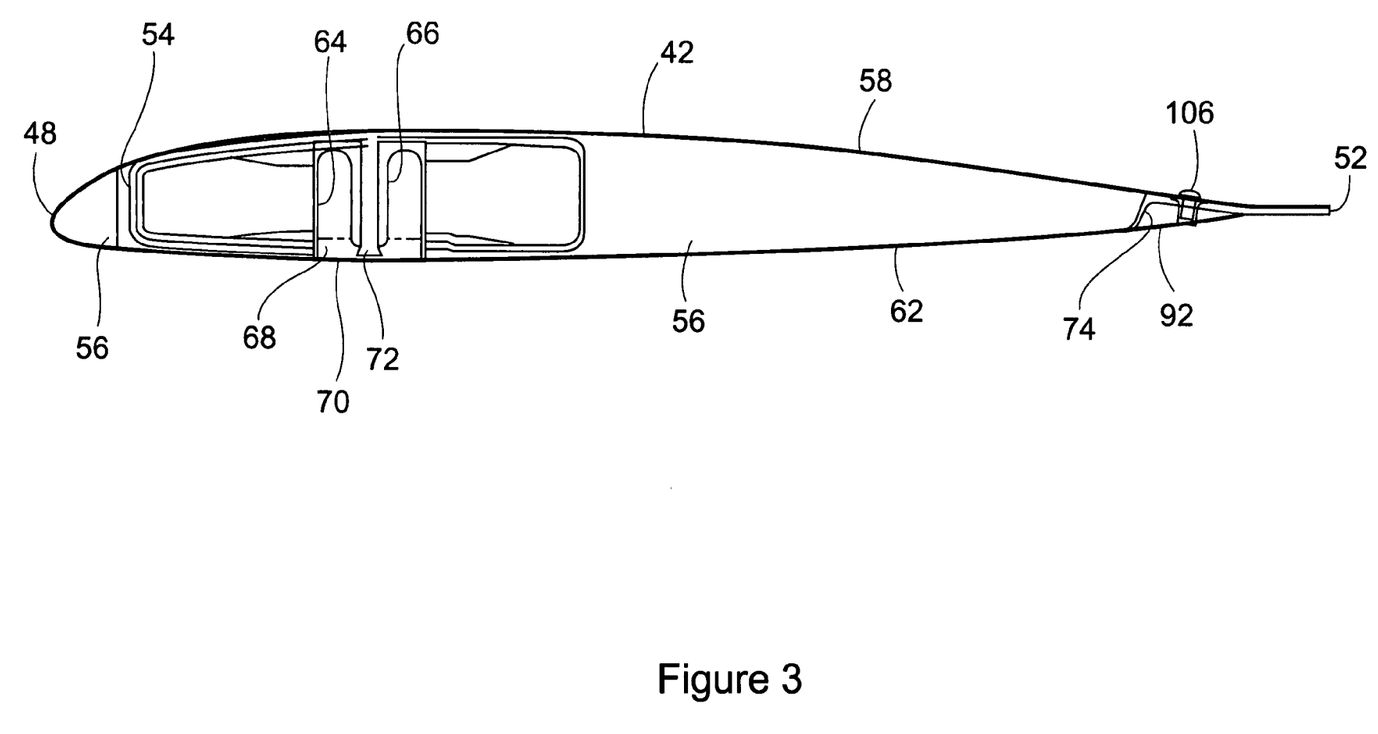
FIG. 3 is a cross section view of the rotor blade of FIG. 2, taken along the line 3—3 of FIG. 2.
Figure 4:
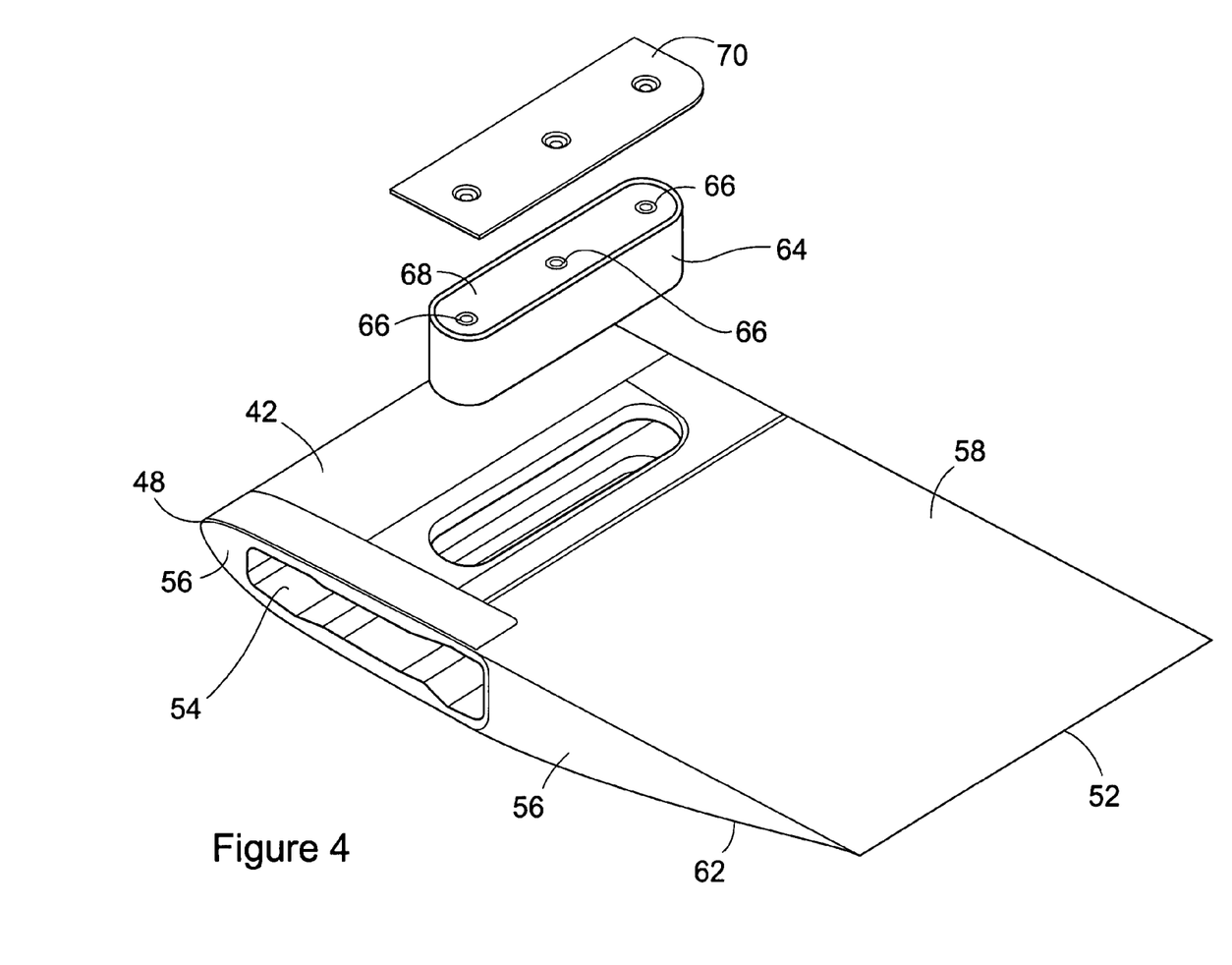
FIG. 4 is a partial assembly view of a part of the weight adjusting and balancing system of the invention.

FIGS. 2 and 3 show a distal end portion of a helicopter main rotor blade 42 incorporating the adjustable weight system of the invention. In the description of the invention to follow, the weight adjustable system is described as being attached to a composite material rotor blade 42 of a helicopter. However, it should be understood that the weight adjustable system of the invention may be employed in other operative environments, and the environment of the composite material helicopter rotor blade 42 used herein is illustrative only and should not be interpreted as limiting.

Only a portion of the distal end of the rotor blade 42 is shown in FIG. 2. The rotor blade 42 has a construction that is typical of composite material rotor blades. The blade 42 has a longitudinal length with opposite proximal 44 and distal 46 ends. The blade 42 has a lateral width between a leading edge 48 and a trailing edge 52 of the blade. As best seen in FIG. 3, the thickness of the rotor blade 42 decreases as it extends from the leading edge 48 to the trailing edge 52.

A tubular spar 54 extends longitudinal through the interior of the rotor blade along the rotor blade length. A core material 56 fills a portion of the rotor blade interior in front of the spar 54 and fills a portion of the rotor blade interior behind the spar. As best seen in FIG. 3, the core material 56 behind the rotor blade spar 54 tapers as it extends to the rotor blade trailing edge 52.

The exterior surfaces of the rotor blade are constructed of layers of composite material. One or more layers of the composite material form the upper surface 58 of the rotor blade and the lower surface 62 of the rotor blade.

A forward weight pocket 64 is formed in the lower surface 62 of the rotor blade adjacent the rotor blade leading edge 48. The forward weight pocket 64 is constructed as prior art forward weight pockets and includes a metal sidewall having an oblong shape. The weight pocket sidewall 64 extends into the interior of the rotor blade tubular spar 54. A plurality of fastener posts 66 are positioned along the center line of the forward weight pocket 64.

A forward weight 68, having a shape complementary to that of the forward weight pocket sidewall 64, is positioned inside the pocket sidewall. A plurality of threaded fasteners 72 secure the weight 68 in the interior of the forward pocket sidewall 64. A cover plate 70 is secured over the forward weight pocket 64 and the forward weight 68 by threaded fasteners (not shown), as is conventional in the prior art.

The construction of the forward pocket 64 of the invention shown in FIG. 3 differs from that of the prior art in that only a single weight 68 is secured in the pocket. This eliminates the second, forward weight of the prior art, and its associated manufacturing and assembly costs.

Figure 5:
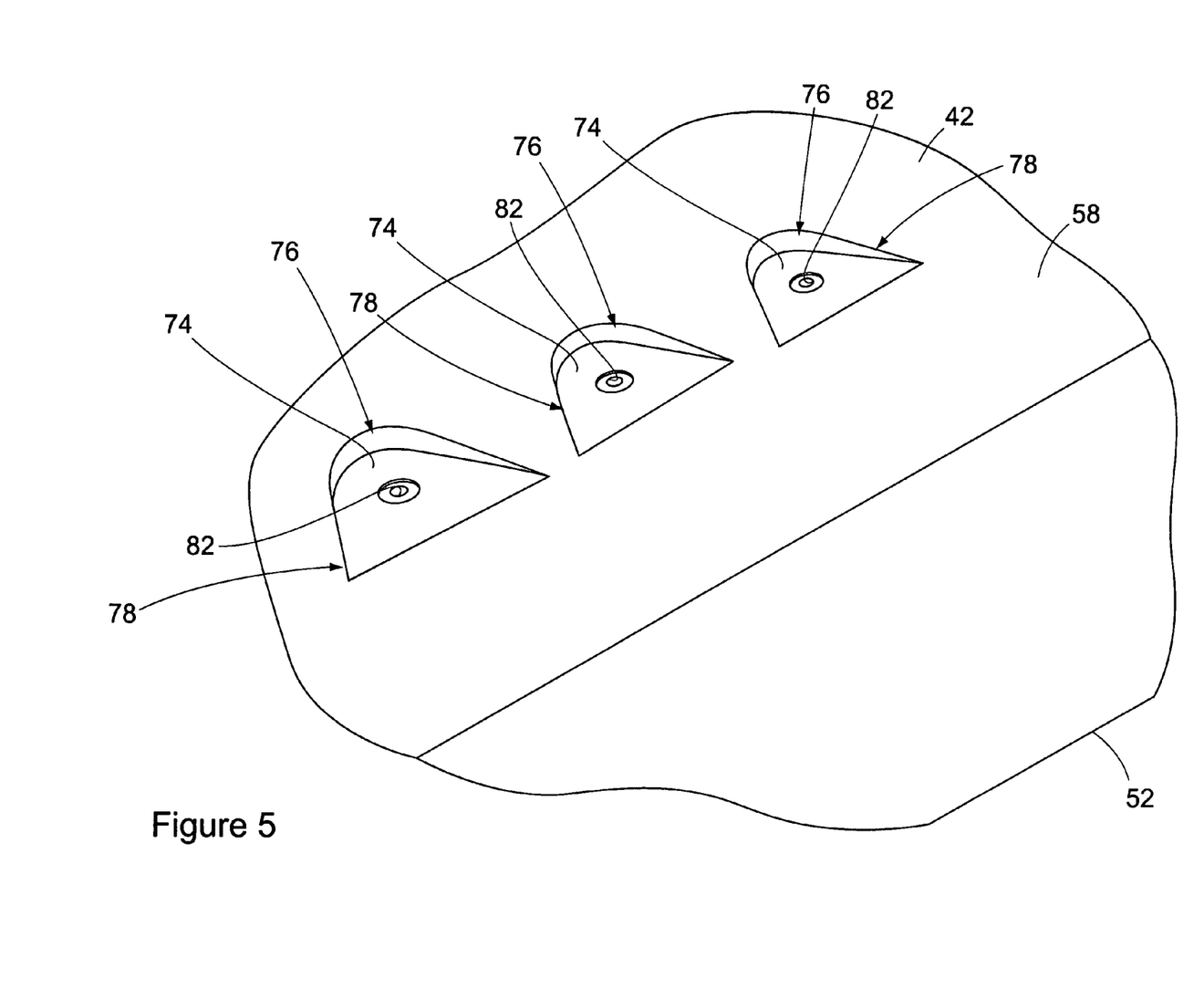
FIG. 5 is a partial view of the rotor blade and the aft weight recesses of the invention.

A plurality of depressions or aft recesses 74 are formed into the composite material layers of the rotor blade lower surface 62 adjacent the blade trailing edge 52. In the preferred embodiment, three aft recesses 74 are formed in the rotor blade. Each of the aft recesses 74 has the same aerodynamic, triangular configuration. An apex area 76 of each recess is positioned in a forward area of the recess toward the rotor blade leading edge 48. A wider, base area 78 of each recess is positioned in the recess toward the rotor blade trailing edge 52. Each recess 74 has a greater depth dimension toward the apex area 76 of the recess, as seen in FIGS. 3 and 5. As each recess 74 extends laterally from the apex area 76 toward the base area 78 and the rotor blade trailing edge 52, the thickness of the recess tapers and decreases.

A fastener hole 82 is positioned in a central portion of each aft recess 74. The fastener hole 82 extends completely through the rotor blade 42 adjacent the rotor blade trailing edge 52.

Figure 7:
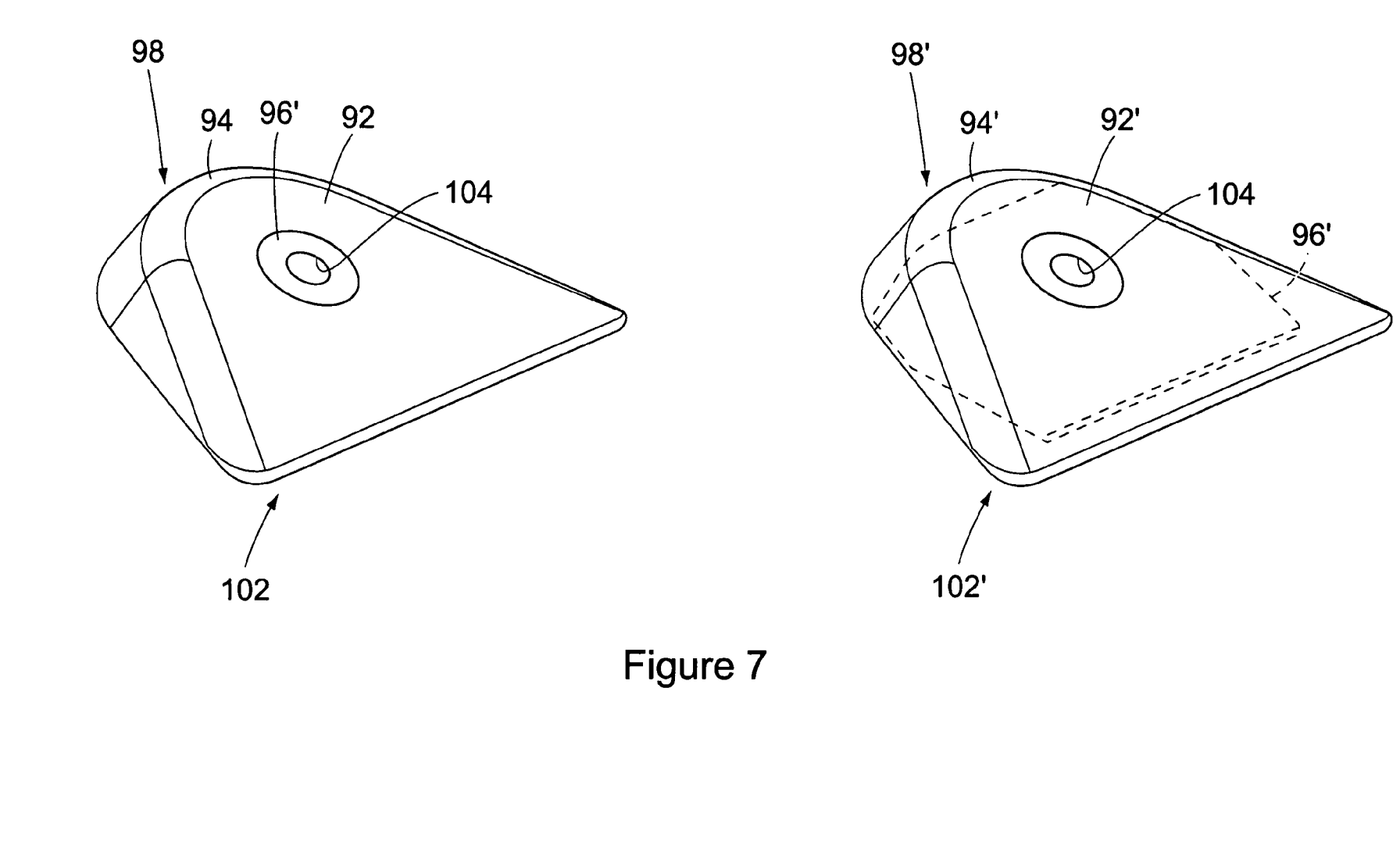
FIGS. 7(a) and 7(b) show two variant embodiments of the aft weights of the invention.

The system of the invention also comprises a plurality of aft weights 92, 92' that are removably attached in the aft recesses 74 of the rotor blade 42. Examples of two of the aft weights 92, 92' of the invention are shown in FIGS. 7a and 7b. Each of the aft weights 92, 92' is comprised of a body 94, 94', preferably of a plastic material, and a metallic core 96, 96'. Other types of materials may be employed in constructing the core 96, 96', with the material of the core primarily providing the weight to the aft weight 92, 92'.

Each aft weight body 94, 94' has an aerodynamic, triangular configuration that is dimensioned to closely match the configuration of one of the aft recesses 74. The aft weight body 94, 94' is formed with an apex portion 98, 98' that is received in the apex area 76 of an aft recess, and a base portion 102, 102' that is received in the base area 78 of the recess. The exterior configurations of the aft weights are substantially the same.

Each of the aft weight cores 96, 96' has an internally threaded screw hole 104. The screw hole 104 is positioned on the weight where it will align with the fastener hole 82 of the aft recess 74 in which the aft weight is positioned. The plurality of aft weights 92, 92' differ from each other in the different sizes and masses of the weight cores 96, 96', as shown in FIGS. 7a and 7b. By providing the aft weights 92, 92' with different size and mass cores 96, 96', a variety of different combinations of weights can be secured in the aft recesses 74 of the rotor blade 42 in balancing the rotor blade.

Figure 6:
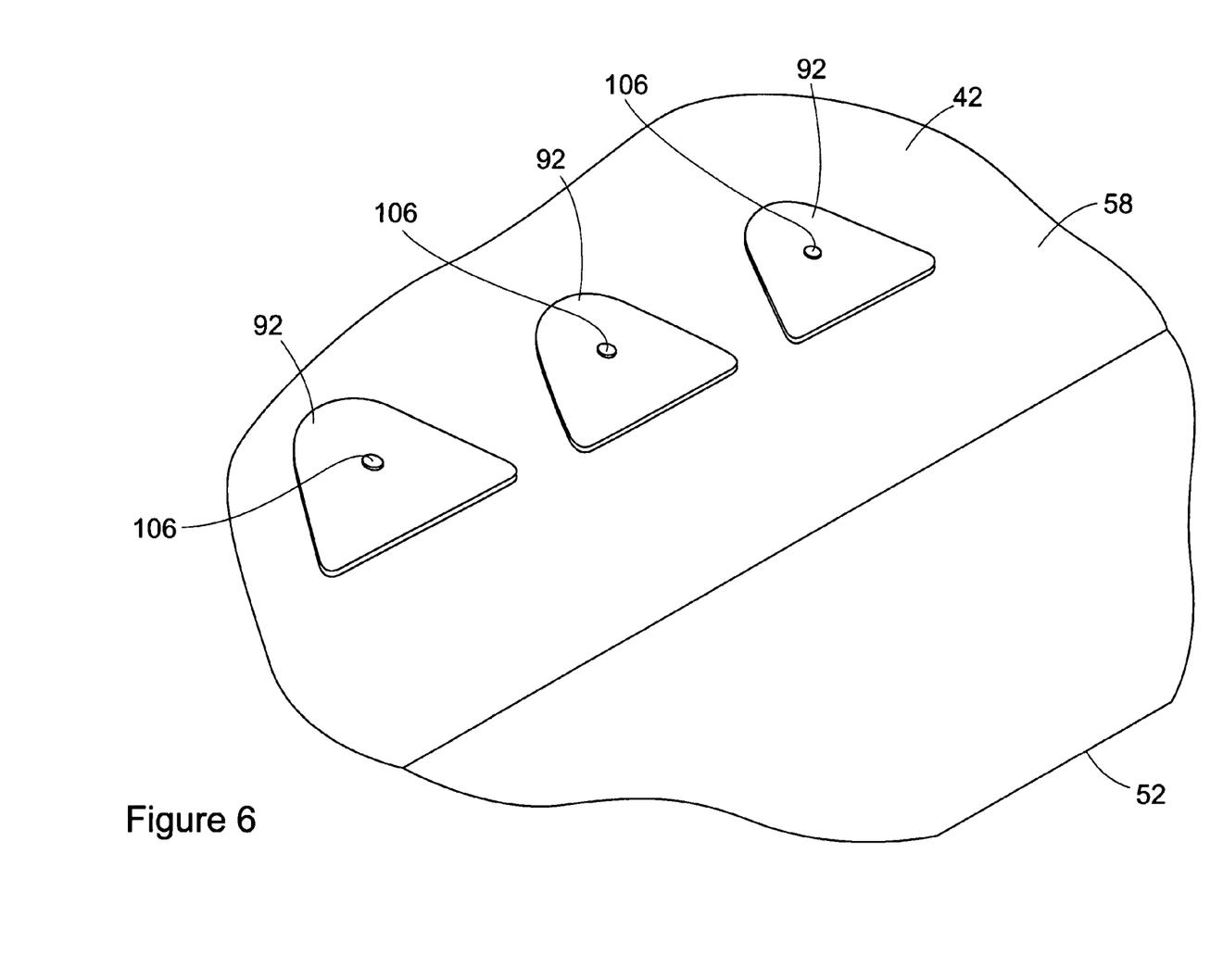
FIG. 6 is a partial view similar to that of FIG. 5, but showing the aft weights secured in the aft weight recesses.

With the aft weight 92 positioned in an aft recess 74, a threaded fastener 106 can be inserted through the recess fastener hole 82 and screw threaded into the aft weight fastener hole 104 in removably attaching the weight to the rotor blade trailing edge 52. With the aft weight 92 secured in the aft recess 74, the exterior surface of the aft weight is flush with the rotor blade lower surface 62. In this manner, the weight of the rotor blade 42 can be adjusted and balanced without appreciably altering the aerodynamics of the rotor blade.

Although a specific embodiment of the system of the invention has been described above, it should be understood that variations and modifications to the system of the invention may be arrived at by the ordinary skilled artisan without departing from the intended scope of the following claims.

What is claimed is:

1. An aircraft rotor comprising:
a rotor blade having a longitudinal length with opposite proximal and distal ends, and opposite leading and trailing edges; and
a balancing weight removably attached to the rotor blade at a position that is intermediate the rotor blade proximal and distal ends and is adjacent the rotor blade trailing edge, the balancing weight having an external configuration that is aerodynamically shaped with a narrow forward end that is positioned toward the rotor blade leading edge, and a wider rearward end that is positioned toward the rotor blade trailing edge.

2. The rotor of claim 1, further comprising:
the rotor blade being constructed of a composite material; and,
the balancing weight being constructed of a metal.

3. The rotor of claim 1, further comprising:
the balancing weight being one of a plurality of balancing weights with each balancing weight of the plurality of balancing weight having a same size and external configuration and each balancing weight having a different weight value.

4. The rotor of claim 1, further comprising:
the balancing weight being one of a plurality of balancing weights spacially arranged along the rotor blade trailing edge.

5. The rotor of claim 4, further comprising: each of the balancing weights having a same size and external configuration.

6. The rotor of claim 1, further comprising:
the rotor blade having a lateral width that is transverse to the rotor blade longitudinal length; and
the balancing weight being positioned laterally closer to the rotor blade trailing edge than the rotor blade leading edge.

7. The rotor of claim 6, further comprising:
a second balancing weight on the rotor blade, the second balancing weight being positioned laterally closer to the rotor blade leading edge than the rotor blade trailing edge.

8. An aircraft rotor comprising:
a rotor blade having a longitudinal length with opposite proximal and distal ends, and a lateral width between opposite leading and trailing edges of the rotor blade;
a set of balancing weights that are removably attachable to the rotor blade, each balancing weight of the set of balancing weights having a same size and external configuration, and at least some of the balancing weights of the set of balancing weights having different weight values; and,
the external configuration of each balancing weight being aerodynamically shaped with a narrow forward end that is positioned toward the rotor blade leading edge, and a wider rearward end that is positioned toward the rotor blade trailing edge.

9. The rotor of claim 8, further comprising:
the rotor blade having a recess formed in the rotor blade, the recess having a configuration that matches the external configuration of the balancing weight to receive one balancing weight of the set of balancing weights in the recess.

10. The rotor of claim 9, further comprising:
the recess being one recess of a plurality of recesses formed in the rotor blade, each of the plurality of recesses having a same configuration that matches the external configurations of the balancing weights.

11. The rotor of claim 8, further comprising:
each balancing weight being removably attachable to the rotor blade adjacent the trailing edge of the rotor blade.

12. The rotor of claim 11, further comprising:
a second balancing weight that is removably attachable to the rotor blade adjacent the leading edge of the rotor blade.

13. An aircraft rotor comprising:
a rotor blade having a longitudinal length with opposite proximal and distal ends, a lateral width between opposite leading and trailing edges of the rotor blade, and a recess formed in the rotor blade adjacent the rotor blade trailing edge;
a balancing weight attached to the rotor blade in the rotor blade recess; and,
the rotor blade recess having an aerodynamic shape with the recess being longitudinally narrow toward the rotor blade leading edge and the recess being wider toward the rotor blade trailing edge.

14. The rotor of claim 13, further comprising:
the rotor blade being constructed of composite materials, and the recess being a molded recess in the rotor blade.

15. The rotor of claim 14, further comprising:
the balancing weight being a metallic balancing weight.

16. The rotor of claim 13, further comprising:
the balancing weight having an external configuration that matches the aerodynamic shape of the recess.

17. An aircraft rotor comprising:
a rotor blade having a longitudinal length with opposite proximal and distal ends, a lateral width between opposite leading and trailing edges of the rotor blade, and a recess formed in the rotor blade adjacent the rotor blade trailing edge,
a balancing weight attached to the rotor blade in the rotor blade recess; and,
the recess having a triangular configuration with an apex positioned toward the rotor blade leading edge and a base positioned toward the rotor blade trailing edge.

18. The rotor of claim 17, further comprising:
the balancing weight having a triangular configuration that matches the triangular configuration of the recess.

19. An aircraft rotor comprising:
a rotor blade having a longitudinal length with opposite proximal and distal ends, a lateral width between opposite leading and trailing edges of the rotor blade, and a recess formed in the rotor blade adjacent the rotor blade trailing edge, a balancing weight attached to the rotor blade in the rotor blade recess; and, the recess having a depth dimension into the rotor blade, and the recess depth dimension decreases as the recess extends from a forward end of the recess toward the rotor blade leading edge, to a rearward end of the recess toward the rotor blade trailing edge.

20. The rotor blade of claim 19, further comprising:

the balancing weight having a forward end and a rearward end that are positioned in the respective forward end and rearward end of the recess, and the balancing weight having a thickness that decreases as the balancing weight extends from the forward end to the rearward end of the balancing weight.

* * * * *